United States Patent
Oba (10) Patent No.: US 10,202,007 B2
(45) Date of Patent: Feb. 12, 2019

(54) PNEUMATIC TIRE

(71) Applicant: SUMITOMO RUBBER INDUSTRIES, LTD., Kobe-shi, Hyogo (JP)

(72) Inventor: Ryo Oba, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 476 days.

(21) Appl. No.: 14/898,196

(22) PCT Filed: Jun. 27, 2014

(86) PCT No.: PCT/JP2014/067221
§ 371 (c)(1),
(2) Date: Dec. 14, 2015

(87) PCT Pub. No.: WO2015/002096
PCT Pub. Date: Jan. 8, 2015

(65) Prior Publication Data
US 2016/0144668 A1    May 26, 2016

(30) Foreign Application Priority Data

| Jul. 5, 2013 | (JP) | 2013-142075 |
| Jul. 5, 2013 | (JP) | 2013-142076 |
| Jul. 5, 2013 | (JP) | 2013-142078 |

(51) Int. Cl.
*B60C 11/03* (2006.01)
*B60C 11/12* (2006.01)

(52) U.S. Cl.
CPC ........ *B60C 11/125* (2013.01); *B60C 11/0306* (2013.01); *B60C 11/0332* (2013.01);
(Continued)

(58) Field of Classification Search
CPC ... B60C 11/0306; B60C 11/11; B60C 11/125; B60C 2011/0348; B60C 2011/0351; B60C 2011/0381; B60C 2011/1254
See application file for complete search history.

(56) References Cited

U.S. PATENT DOCUMENTS

2011/0024012 A1\*  2/2011  Iwai ............... B60C 11/0306
                                                   152/209.27
2011/0088821 A1\*  4/2011  Imakita ........... B60C 11/0302
                                                   152/209.15
(Continued)

FOREIGN PATENT DOCUMENTS

EP        213452 A2 \*  3/1987
EP      0 855 292 A1    7/1998
(Continued)

OTHER PUBLICATIONS

Machine translation for Japan 2001-187517 (Year: 2018).\*
(Continued)

*Primary Examiner* — Steven D Maki
(74) *Attorney, Agent, or Firm* — Birch, Stewart, Kolasch & Birch, LLP (57) ABSTRACT

To provide a pneumatic tire which is improved in on-snow performance, while maintaining steering stability on dry road surface. The pneumatic tire is provided in a tread portion 2 with a pair of shoulder main grooves 3, a center main groove 4, shoulder land portions 6, and middle land portions 5. The middle land portions 5 are provided with middle lateral grooves 10 extending from the shoulder main grooves 3 toward the inside in the tire axial direction, while gradually decreasing the angle with respect to tire circumferential direction. The middle lateral groove 10 is provided with a groove bottom sipe 15 opened in the groove bottom.

14 Claims, 6 Drawing Sheets

(52) U.S. Cl.
CPC ...... *B60C 11/1236* (2013.01); *B60C 11/1272* (2013.01); *B60C 2011/039* (2013.01); *B60C 2011/0334* (2013.01); *B60C 2011/0344* (2013.01); *B60C 2011/0348* (2013.01); *B60C 2011/0351* (2013.01); *B60C 2011/0353* (2013.01); *B60C 2011/0355* (2013.01); *B60C 2011/0365* (2013.01); *B60C 2011/0367* (2013.01); *B60C 2011/0381* (2013.01); *B60C 2011/0393* (2013.01); *B60C 2011/0395* (2013.01)

(56) References Cited

U.S. PATENT DOCUMENTS

| | | | | |
|---|---|---|---|---|
| 2012/0160385 | A1* | 6/2012 | Tanaka | B60C 11/0306 152/209.22 |
| 2013/0248068 | A1* | 9/2013 | Nakata | B60C 11/0306 152/209.18 |

FOREIGN PATENT DOCUMENTS

| | | | |
|---|---|---|---|
| JP | 06-040215 | A | 2/1994 |
| JP | 08-091023 | A * | 4/1996 |
| JP | 09-188110 | A | 7/1997 |
| JP | 10-264613 | A | 10/1998 |
| JP | 2001-187517 | A * | 7/2001 |
| JP | 2003-63212 | A | 3/2003 |
| JP | 2006-131081 | A | 5/2006 |
| JP | 2010-184616 | A | 8/2010 |
| JP | 2012-136187 | A | 8/2010 |
| JP | 2011-031773 | A | 2/2011 |

OTHER PUBLICATIONS

Machine translation for Europe 213452 (Year: 2018).*
Machine translation for Japan 08-091023 (Year: 2018).*
Extended European Search Report dated Mar. 1, 2017, for European Application No. 14820086.8.

* cited by examiner

PNEUMATIC TIRE

TECHNICAL FIELD

The present invention relates to a pneumatic tire which is improved in on-snow performance, while maintaining steering stability on dry road surface,

BACKGROUND ART

There has been proposed a pneumatic tire provided in the tread portion with sipes and lateral grooves extending in the tire axial direction.
Such pneumatic tire is improved in running performance on snow (hereinafter, referred to as "on-snow performance") by edge components of the lateral grooves and the sipes.

The lateral grooves and sipes as described above, however, reduce the rigidity of the tread portion, and there is a problem of such that the steering stability on dry road surface is deteriorated.

In the following Patent Document 1, there has been proposed a pneumatic tire in which the inclination direction of belt cords of a belt ply, and the inclination direction of lateral grooves in the tread portion are defined in order to suppress a decrease in the rigidity of the tread portion.

PRIOR ART DOCUMENT

Patent Document

Patent document 1: Japanese Patent Application Publication No. 2012-136187

The pneumatic tire of Patent Document 1 however, has room for further improvement in the on-snow performance.

SUMMARY OF THE INVENTION

Problems that the Invention is to Solve

The present invention has been devised in view of the circumstance as described above, and a primary object is to provide a pneumatic tire improved in the on-snow performance, while maintaining the steering stability on dry road surface.

Means for Solving the Problems

The present invention is a pneumatic tire provided in a tread portion with a pair of shoulder main grooves extending continuously in the tire circumferential direction on the most tread edge side, a center main groove extending continuously in the tire circumferential direction on the inner side in the tire axial direction of the shoulder main grooves, a shoulder land portion on the outer side in the tire axial direction of each of the shoulder main grooves, and a middle land portion between the shoulder main groove and the center main groove, and characterized in that the middle land portion is provided with a middle lateral groove extending from the shoulder main groove toward the inside in the tire axial direction, while decreasing the angle with respect to the tire circumferential direction, and the middle lateral groove is provided with a groove bottom sipe extending along the middle lateral groove and opened in the groove bottom of the middle lateral groove.

In another aspect of the present invention, the groove depth of the middle lateral groove may be set in a range of 0.6 to 1.5 mm.

In another aspect of the present invention, the middle lateral groove may include a first middle lateral groove extending to the center main groove and a second middle lateral groove terminating in the middle land portion which are alternate in the tire circumferential direction.

In another aspect of the present invention, the angle of the middle lateral groove with respect to the tire circumferential direction may be set in a range of 40 to 60 degrees.

In another aspect of the present invention, the groove width of the middle lateral groove may be set in a range of 1.3 to 3.0 mm.

In another aspect of the present invention, the width of the groove bottom sipe may be set in a range of 0.4 to 1.0 mm.

In another aspect of the present invention, a ratio Sr/Sv between an actual ground contacting area Sr of the middle land portion and a virtual ground contacting area Sv of the middle land portion measured in such a state that all grooves provided in the middle land portion are filled may be set to 0.80 to 0.90.

In another aspect of the present invention, a ratio W8/W3 between a width W8 in the tire axial direction of the shoulder land portion and a width W3 in the tire axial direction of the middle land portion may be set to 1.6 to 2.0.

In another aspect of the present invention, by being provided with a shoulder sub groove extending continuously in the tire circumferential direction and having a smaller groove width than that of the shoulder main groove, the shoulder land portion may include a main portion on the outside in the tire axial direction of the shoulder sub groove and a secondary portion between the shoulder sub groove and the shoulder main groove.
In this case, a ratio W7/W8 between a width W7 in the tire axial direction of the secondary portion and the width W8 in the tire axial direction of the shoulder land portion may be set in the range of 0.15 to 0.30.

In another aspect of the present invention, the main portion may be provided with a plurality of shoulder lug grooves extending from the tread edge toward the inside in the tire axial direction and terminating without being communicated with the shoulder sub groove.

In another aspect of the present invention, the main portion may be provided with a first shoulder sipe of which inner end in the tire axial direction terminates within the main portion.

In another aspect of the present invention, the shoulder land portion may be provided with a second shoulder sipe extending from the inner end in the tire axial direction of the shoulder lug groove to the shoulder main groove.

In another aspect of the present invention, the second shoulder sipes may be inclined to the opposite direction to the middle lateral groove with respect to the tire axial direction.

In another aspect of the present invention, a groove width W6 of the shoulder sub groove may be set in a range of 1.3% to 2.7% of the tread width TW which is the distance in the tire axial direction between tread edges.

In another aspect of the present invention, the groove depth d5 of the shoulder sub groove may be set in a range of 0.25 to 0.50 times the groove depth d1 of the shoulder main groove.

Effect of the Invention

In the pneumatic tire of the present invention, by being provided in the tread portion with a pair of the shoulder main grooves extending continuously in the tire circumferential direction on the most tread edge side, and the center main groove extending continuously in the tire circumferential direction on the inner side in the tire axial direction of the shoulder main groove,
a pair of the shoulder land portions on the outer side in the tire axial direction of a pair of the shoulder main grooves, and a pair of the middle land portions between the shoulder main grooves and the center main groove
are sectioned.

The middle land portion is provided with the middle lateral groove extending from the shoulder main groove toward the inner side in the tire axial direction, while gradually decreasing the angle with respect to the tire circumferential direction.
Such middle lateral groove suppresses a decrease in the rigidity in the tire circumferential direction of the middle land portion in an inside part in the tire axial direction of the middle land portion to which a large ground contact pressure is applied. Thus, the steering stability on dry road surface is maintained. In addition, the middle lateral groove increases the edge component extending in the tire circumferential direction in the inside part in the tire axial direction of the middle land portion.
Therefore, side skidding on snowy road is suppressed especially and the on-snow performance is improved.

The middle lateral groove is provided with the groove bottom sipe which extends along the middle lateral groove and opens in the groove bottom of the middle lateral groove. Such groove bottom sipe effectively absorbs water in the snow compressed in the middle lateral groove when running on snowy roads.
Thus, the occurrence of water film between the tread of the middle land portion and the road surface is suppressed, and the on-snow performance is improved.
In addition, for example, when running on snowy roads, such groove bottom sipe allows the middle lateral groove to open largely and increases the groove volume. Therefore, the on-snow performance is improved.
Furthermore, the deformation of the middle land portion when contacting with the ground can bring the edges of both of the middle lateral groove and the groove bottom sipe into contact with the road surface. Therefore, performance on icy and snowy roads is further improved.

MODE FOR CARRYING OUT THE INVENTION

Figure 1:
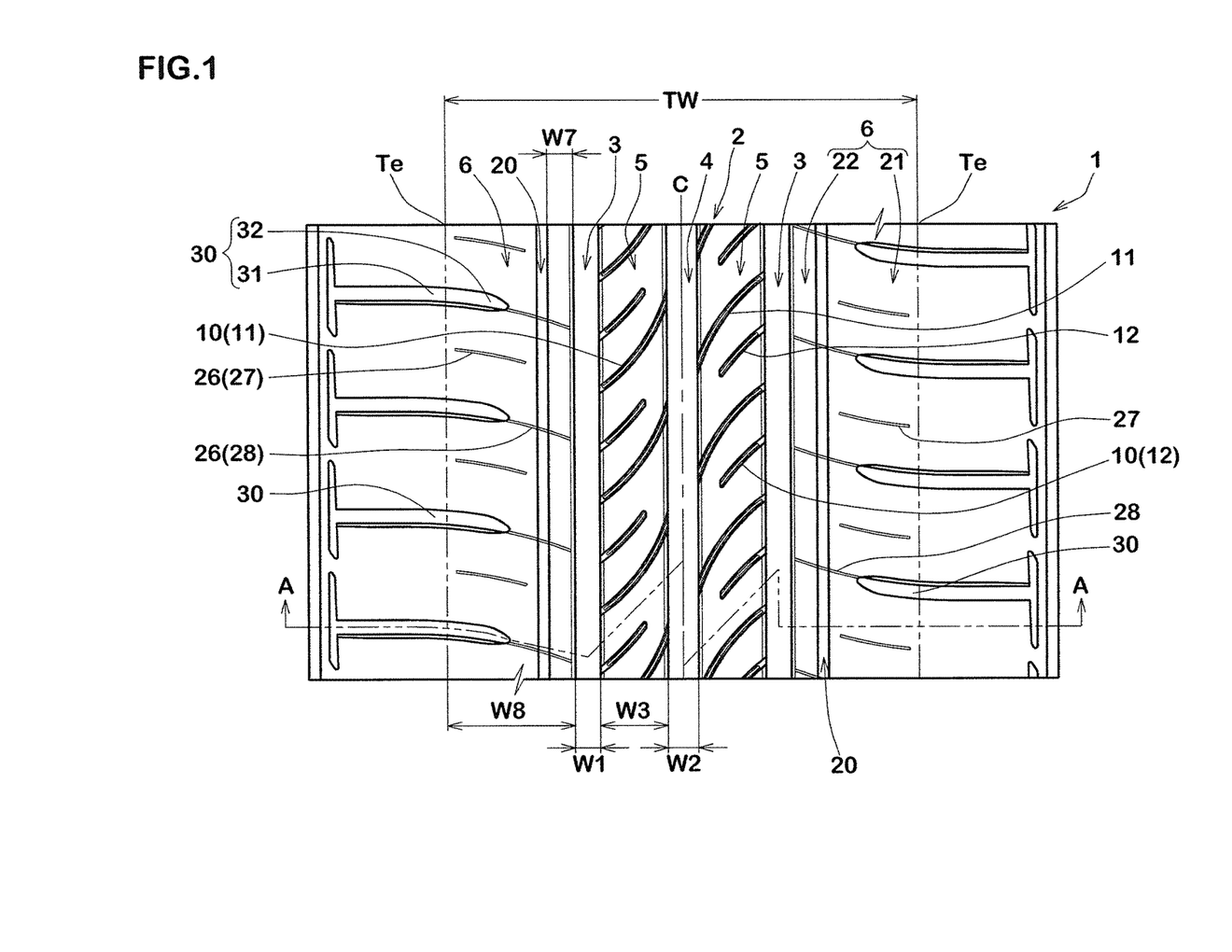
[FIG. 1] a development view of a tread portion of a pneumatic tire of the present embodiment.

Hereinafter, an embodiment of the present invention will be described with reference to the drawings.
FIG. 1 is a development view of a tread portion 2 of a pneumatic tire of the present embodiment (hereinafter, simply referred to as "tire") 1.
The pneumatic tire 1 of the present embodiment is suitably used as, for example, a radial tire for passenger cars.

As shown in FIG. 1, the tread portion 2 of the tire 1 is provided with a pair of shoulder main grooves 3, 3 and a center main groove 4 therebetween.
The shoulder main groove 3 extends continuously in the tire circumferential direction on the most tread edge Te side. The shoulder main groove 3 in the present embodiment has a substantially constant groove width, and is straight. The shoulder main groove 3 may be wavy or zigzag-shaped.

"Tread edge Te" is the axially outermost ground contacting position when the tire 1 under a normal state is loaded with a normal load and brought into contact with a flat surface at a camber angle of 0 degree.

"Normal state" is a no-load state of the tire mounted on a standard rim (not shown) and inflated to a normal inner pressure.
Hereinafter, dimensions of respective portions of the tire means values measured under the normal state unless otherwise noted.

"Standard rim" In a standard system including a standard on which tires are based, rims which the standard specify for the respective tires are meant, for example "standard rim" in JATMA, "Design Rim" in TRA, "Measuring Rim" ETRTO.

"Normal inner pressure" In a standard system including a standard on which tires are based, air pressures which the standard specify for the respective tires are meant, for example "Maximum air pressure" in JATMA, the maximum value described in "TIRE LOAD LIMITS AT VARIOUS COLD INFLATION PRESSURES" table in TRA, "INFLATION PRESSURE" in ETRTO.

"Normal load" In a standard system including a standard on which tires are based, loads which the standard specify for the respective tires are meant, for example "Maximum load capacity" in JATMA, the maximum value described in "TIRE LOAD LIMITS AT VARIOUS COLD INFLATION PRESSURES" table in TRA, "LOAD CAPACITY" in ETRTO.

Figure 2:
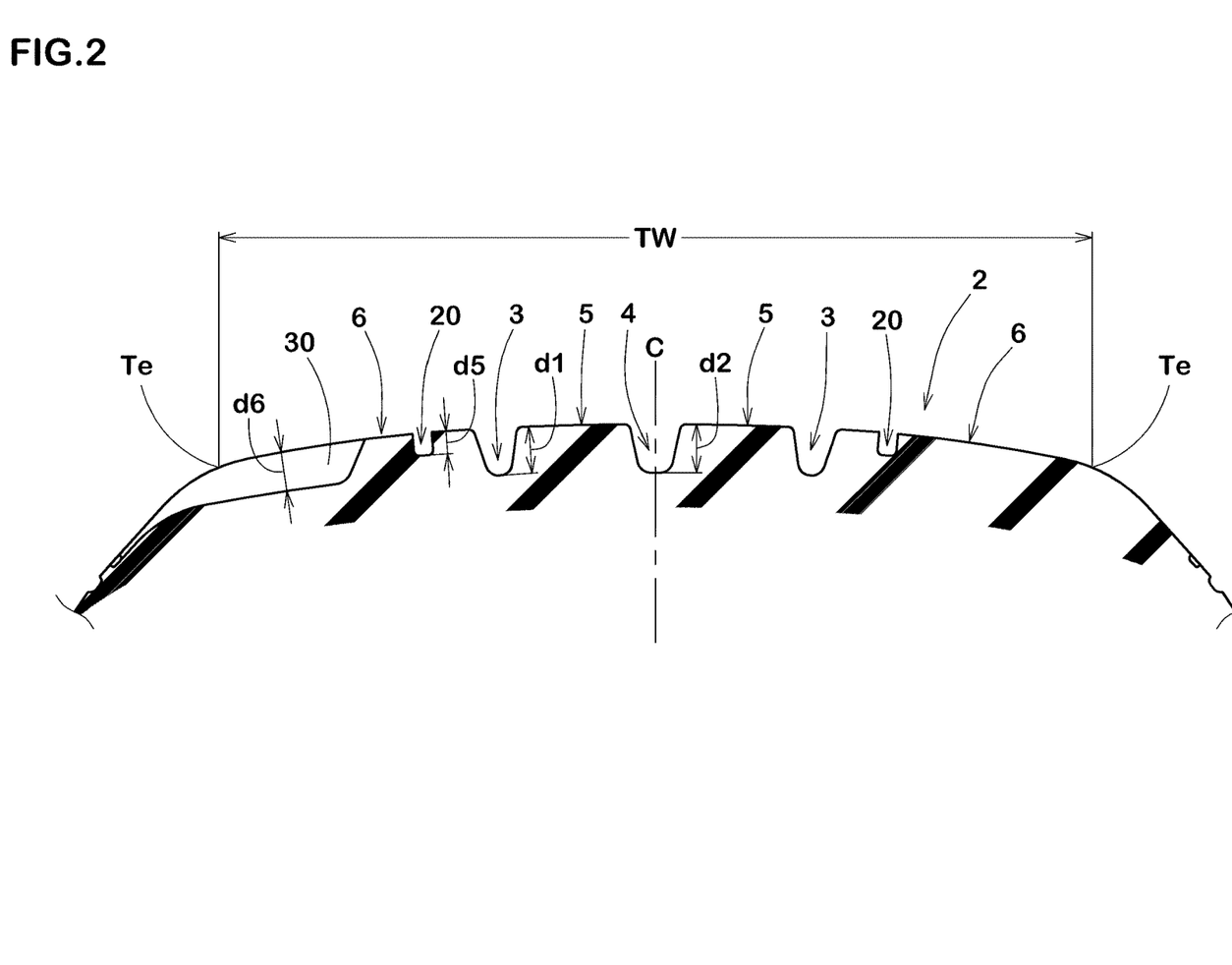
[FIG. 2] an A-A line sectional view of FIG. 1.
Figure 3:
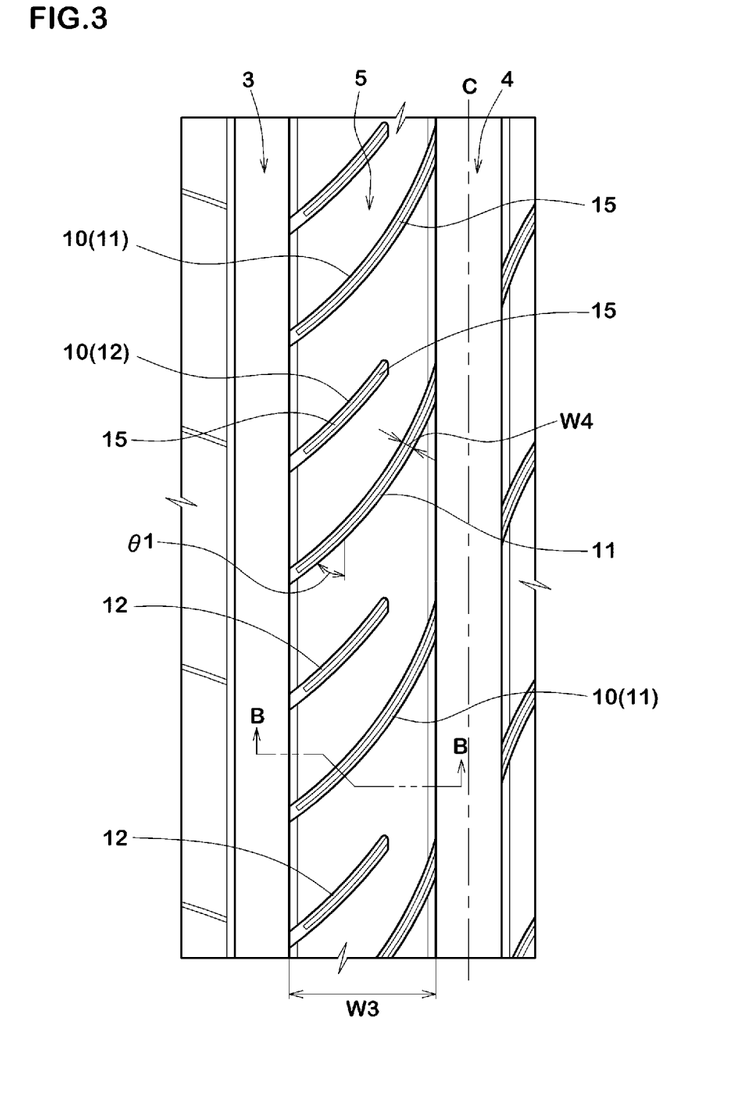
[FIG. 3] an enlarged view of the middle land portion in FIG. 1.

The center main groove 4 is disposed inside the shoulder main groove 3 in the tire axial direction.
The center main groove 4 extends continuously in the tire circumferential direction.
The center main groove 4 has a substantially constant groove width and is straight.
The center main groove 4 in the present embodiment is one groove disposed on the tire equator C.
For example, the center main groove 4 may be disposed on each sides in the tire axial direction of the tire equator C.
The groove width W1 of the shoulder main groove 3 and the groove width W2 of the center main groove 4 are for example 2.5% to 4.5% of the tread width TW.
Such shoulder main groove 3 and center main groove 4 exert excellent wet performance, while maintaining the rigidity of the tread portion 2.
The tread width TW is a distance in the tire axial direction between the tread edges Te, Te of the tire 1 under the standard state.
In FIG. 2, there is shown A-A line cross section of FIG. 1.
As shown in FIG. 2, the groove depth d1 of the shoulder main groove 3 and the groove depth d2 of the center main groove 4 are preferably 5 to 10 mm for example.
As shown in FIG. 1, the tread portion 2 is partitioned into a pair of middle land portions 5, 5 and a pair of shoulder land portions 6, 6.
In FIG. 3, there is shown an enlarged view of the middle land portion 5.

As shown in FIG. 3, the middle land portion 5 is disposed between the shoulder main groove 3 and the center main groove 4.

The width W3 in the tire axial direction of the middle land portion 5 is preferably 0.10 or more times, more preferably 0.12 or more times, and preferably 0.16 or less times, more preferably 0.14 or less times the tread width TW (shown in FIG. 1).

Such middle land portion 5 makes it possible to achieve both of the steering stability on dry road and the on-snow performance.

The middle land portion 5 is provided with a plurality of middle lateral grooves 10.

All of the middle lateral grooves 10 are inclined in the same direction with respect to the tire axial direction.

The middle lateral groove 10 extends from the shoulder main groove 3 toward the inside in the tire axial direction, while gradually decreasing the angle θ1 with respect to the tire circumferential direction.

The middle lateral groove 10 in the present embodiment extends while curving smoothly in an arc shape.

In an inside part in the tire axial direction of the middle land portion 5 where large ground contact pressure tends to act, such middle lateral groove 10 suppresses a decrease in the rigidity in the tire circumferential direction of the middle land portion 5.

Thus, the steering stability on dry road surface is maintained. In addition, the middle lateral groove 10 increases the edge component extending in the tire circumferential direction in the inside part in the tire axial direction of the middle land portion 5.

Therefore, it provides excellent edge effect in the tire axial direction, and especially skidding on snowy road is suppressed to improve the on-snow performance.

The angle θ1 of the middle lateral groove 10 with respect to the tire circumferential direction is preferably 40 degrees or more, more preferably 45 degrees or more, and preferably 60 degrees or less, and more preferably 55 degrees or less. If the angle θ1 is small, the rigidity in the tire axial direction of the middle land portion 5 is decreased, and there is a possibility that the steering stability on dry road surface is deteriorated.

If the angle θ1 is large, the edge component in the tire circumferential direction is decreased, and there is a possibility that the on-snow performance is deteriorated.

For example, the middle lateral grooves 10 include a first middle lateral groove 11 and a second middle lateral groove 12.

The first middle lateral groove 11 extends from the shoulder main grooves 3 to the center main groove 4.

The second middle lateral groove 12 extends from the shoulder main groove 3 toward the inner side in the tire axial direction and terminates in the middle land portion 5.

Such first middle lateral groove 11 and second middle lateral groove 12 increase the edge components, while maintaining the rigidity of an inside part in the tire axial direction of the middle land portion 5 where a large ground pressure tends to act. Thereby, the steering stability on dry road surface is improved. In a preferred embodiment, the first middle lateral groove 11 and the second middle lateral groove 12 are provided alternately in the tire circumferential direction.

Thereby, the rigidity distribution of the middle land portion 5 becomes smooth, and uneven wear of the middle land portion 5 is suppressed.

The middle lateral groove 10 is provided with a groove bottom sipe 15. The groove bottom sipe 15 extends along the middle lateral groove 10.

In this specification, "sipe" means a cut whose width is 0.5 to 1.0 mm, and is distinguished from a groove for drainage.

Figure 4:
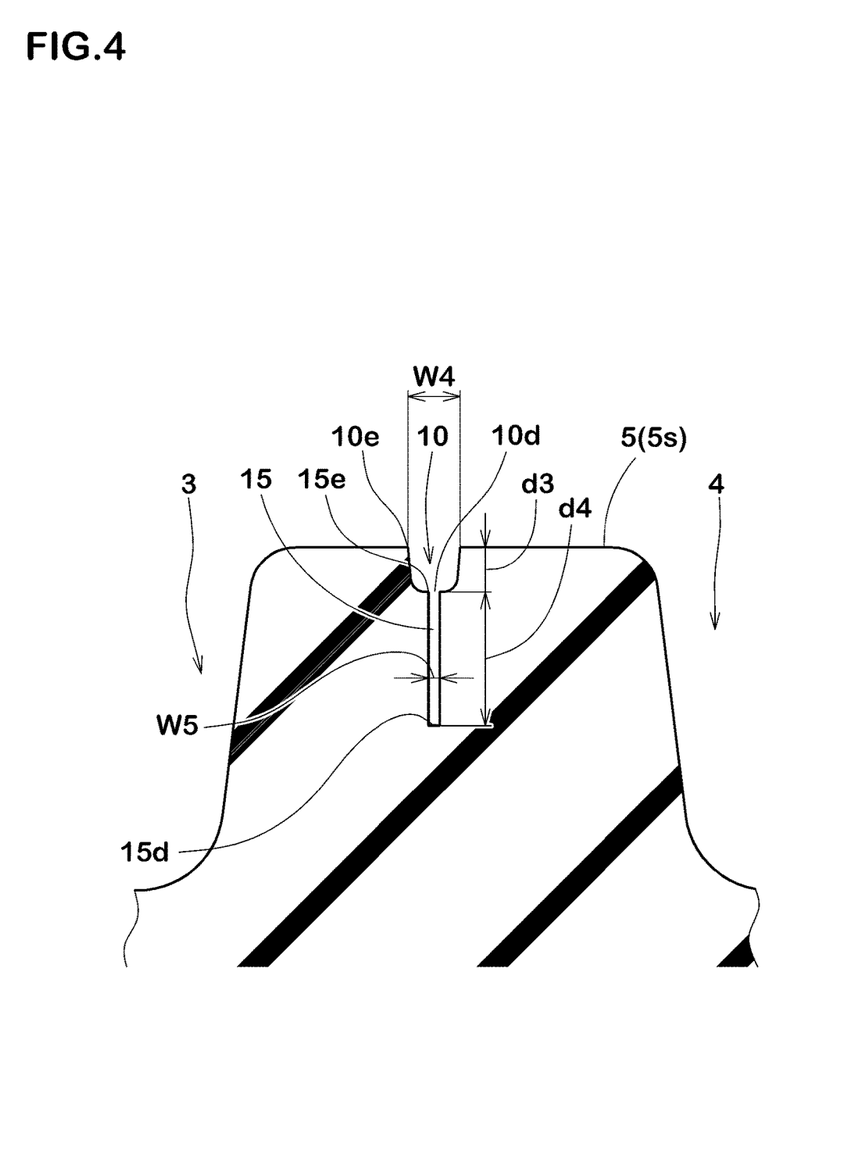
[FIG. 4] a sectional view taken along line B-B of FIG. 3.

In FIG. 4, there is shown B-B cross section of the middle lateral groove 10 in FIG. 3.

As shown in FIG. 4, the groove bottom sipe 15 opens in the groove bottom 10d of the middle lateral groove 10.

Such groove bottom sipe 15 effectively absorbs water in the snow compressed in the middle lateral groove 10 during running on snowy roads.

Thus, the occurrence of water film between the tread 5s of the middle land portion 5 and the road surface is suppressed, and the on-snow performance is improved.

In addition, such groove bottom sipe 15 allows the middle lateral groove 10 to open largely and increases the groove volume, for example, when running on snowy roads.

Therefore, the on-snow performance is improved.

Figure 5:
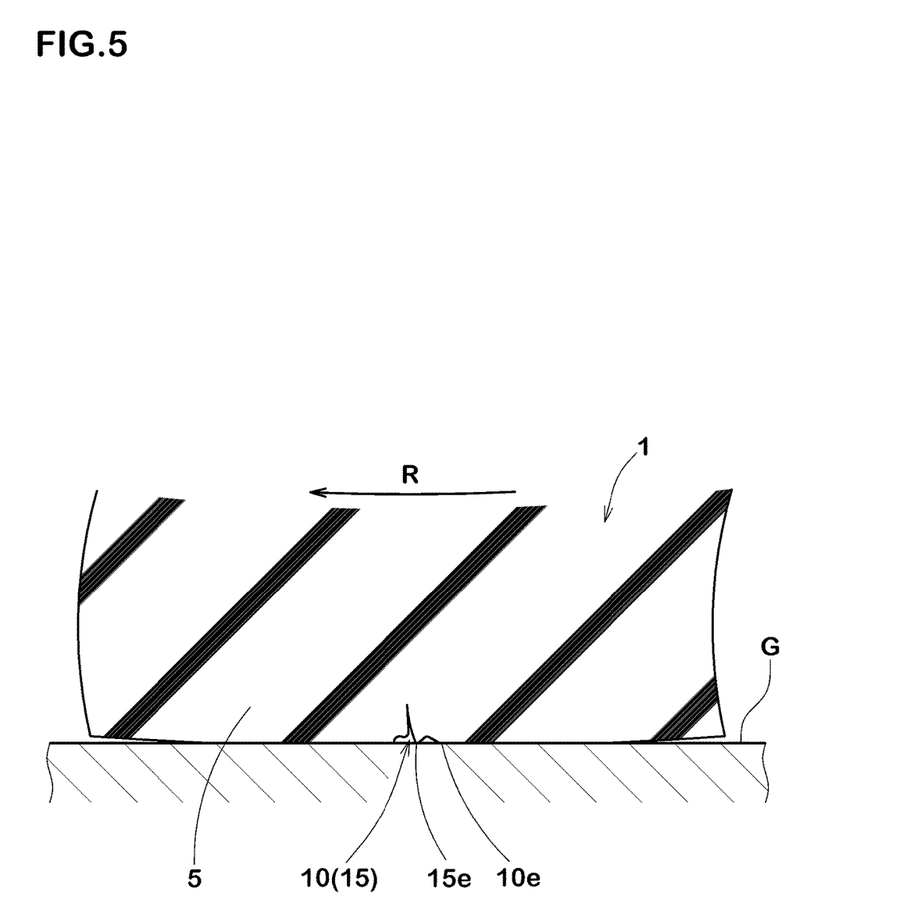
[FIG. 5] an explanatory diagram showing the middle lateral groove during running.

In FIG. 5, there is shown a sectional view of the middle lateral groove 10 when the tire 1 is running with a driving force acting in the direction of the arrow R.

As shown in FIG. 5, by the deformation of the middle land portion 5 when contacting with the ground, the edges 15e of the groove bottom sipe 15 and the edges 10e of the middle lateral groove 10 can be brought into contact with the road surface G. Therefore, performance on icy and snowy roads is further improved.

As shown in FIG. 4, the groove width W4 of the middle lateral groove 10 is preferably 1.3 mm or more, more preferably 1.6 mm or more, preferably 3.0 mm or less, more preferably 2.7 mm or less.

If the groove width W4 of the middle lateral groove 10 is small, there is a possibility that, when running, the edges 15e of the groove bottom sipe 15 do not come into contact with the road surface.

If the groove width W4 of the middle lateral groove 10 is large, there is a possibility that the rigidity of the middle land portion 5 is decreased, and the steering stability on dry road surface is deteriorated.

The groove depth d3 of the middle lateral groove 10 is preferably 0.6 mm or more, more preferably 0.8 mm or more, and preferably 1.5 mm or less, more preferably 1.2 mm or less.

If the groove depth d3 of the middle lateral groove 10 is small, there is a possibility that the groove volume of the middle lateral groove 10 is reduced, and the on-snow performance is deteriorated.

If the groove depth d3 of the middle lateral groove 10 is large, there is a possibility that the edges 15e of the groove bottom sipe 15 do not come into contact with the road surface.

The width W5 of the groove bottom sipe is preferably 0.4 mm or more, more preferably 0.6 mm or more, preferably 1.0 mm or less, more preferably 0.8 mm or less.

If the width W5 of the groove bottom sipe 15 is small, there is a possibility that, during running snowy roads, water in the snow compressed in the middle lateral groove 10 is not absorbed.

If the width W5 of the groove bottom sipe 15 is large, there is a possibility that the rigidity of the middle land portion 5 is decreased, and the steering stability on dry road surface is deteriorated.

From the same viewpoint, the depth d4 of the groove bottom sipe 15 is preferably 2.5 mm or more, more preferably 2.8 mm, and preferably 3.5 mm or less, more preferably 3.2 mm or less.

The depth d4 of the groove bottom sipe is a distance in the tire radial direction from the groove bottom 10d of the middle lateral groove 10 to the groove bottom 15d of the groove bottom sipe 15.

The ratio d3/d4 between the groove depth d3 of the middle lateral groove 10 and the depth d4 of the groove bottom sipe 15 is preferably 0.30 or more, more preferably 0.33 or more, and preferably 0.40 or less, more preferably 0.37 or less. Such middle lateral groove 10 and the groove bottom sipe 15 exhibit excellent on-snow performance, while maintaining the rigidity of the middle land portion 5.

The ratio Sr/Sv between the actual ground contacting area Sr of the middle land portion 5 and the virtual ground area Sv of the middle land portion 5 measured under such a state that all grooves disposed in the middle land portion 5 are filled, is preferably 0.80 or more, more preferably 0.83 or more.

If the ratio Sr/Sv is smaller than 0.80, there is a possibility that the steering stability on dry road surface is deteriorated. The ratio Sr/Sv is preferably 0.90 or less, more preferably 0.87 or less.

If the ratio Sr/Sv is more than 0.90, there is a possibility that wet performance and the on-snow performance are deteriorated.

Figure 6:
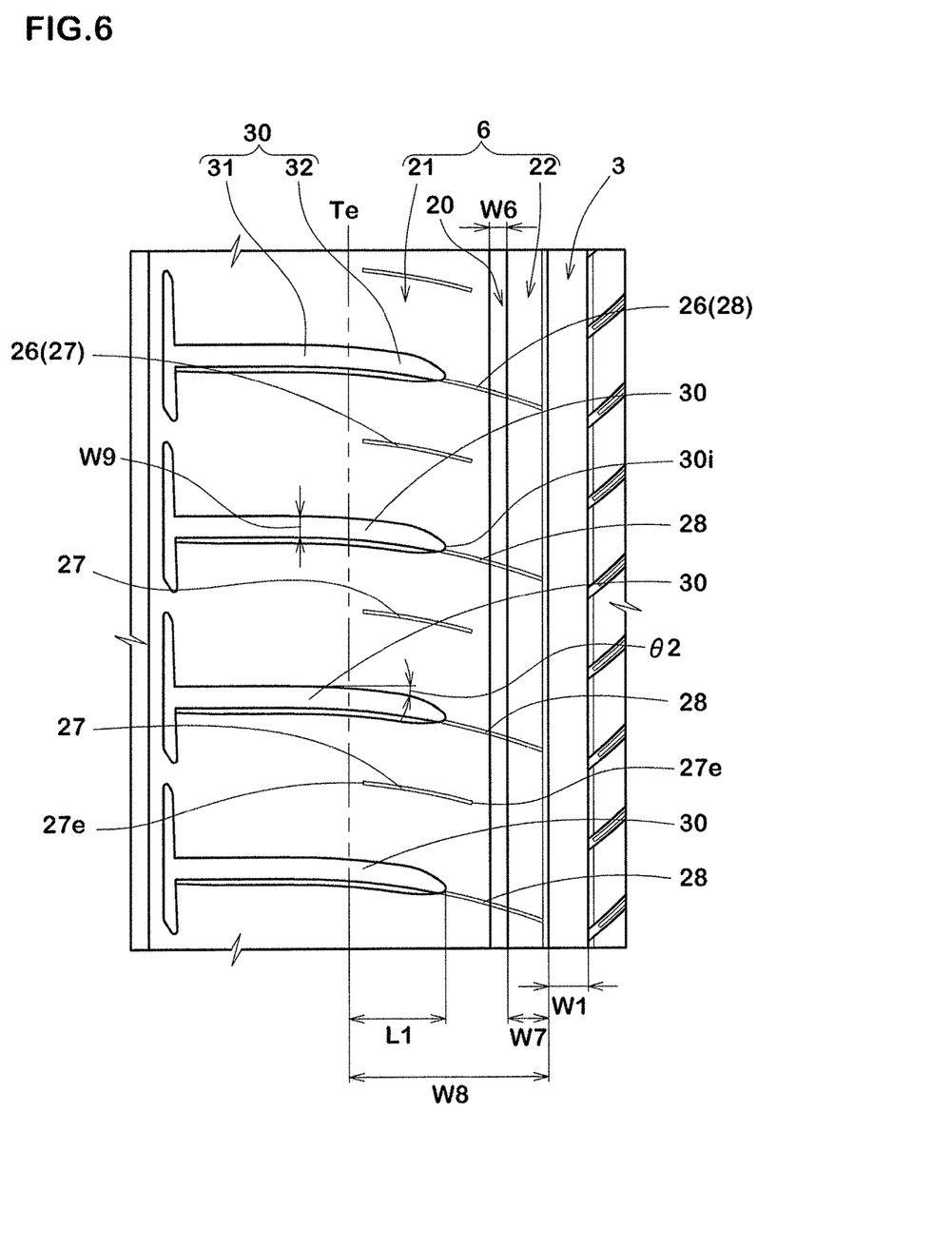
[FIG. 6] an enlarged view of the shoulder land portion in FIG. 1.

In FIG. 6, there is shown an enlarged view of the shoulder land portion 6.

As shown in FIG. 6, the shoulder land portion 6 is disposed on the outer side in the tire axial direction of the shoulder main groove 3.

The width W8 in the tire axial direction of the shoulder land portion 6 is preferably 0.23 or more times, more preferably 0.25 or more times, and preferably 0.32 or less times, more preferably 0.30 or less times the tread width TW.

Such shoulder land portion 6 improves the steering stability on dry road surface, while maintaining the wet performance.

The ratio W8/W3 between the width W8 in the tire axial direction of the shoulder land portion 6 and the width W3 in the tire axial direction of the middle land portion is preferably 1.6 or more, more preferably 1.7 or more, and preferably 2.0 or less, more preferably 1.9 or less.

Such shoulder land portion 6 secures a sufficient width in the tire axial direction, and improves the steering stability on dry road surface.

Further, due to this ratio, the shoulder main groove 3 is disposed at a position where a larger ground contact pressure acts than in the typical shoulder main groove of a conventional pneumatic tire.

For this reason, the shoulder main groove 3 exhibits excellent edge effect and improves the on-snow performance.

The shoulder land portion 6 is provided with a shoulder sub groove 20 extending continuously in the tire circumferential direction.

The shoulder minor groove 20 extends continuously in the tire circumferential direction.

The shoulder sub groove 20 of the present embodiment has a substantially constant groove width and is straight.

The shoulder minor groove 20 may be wavy or zigzag-shaped.

The shoulder minor groove 20 has a smaller groove width W6 than the groove width W1 of the shoulder main groove 3. Such shoulder sub groove 20 increases the edge component, while maintaining the rigidity of the shoulder land portion 6. Therefore, side slip during running on snow can be effectively suppressed, while maintaining the steering stability on dry road surface.

The groove width W6 of the shoulder sub groove 20 is preferably 0.35 or more times, more preferably 0.40 or more times, and preferably 0.55 or less times, more preferably 0.50 or less times the groove width W1 of the shoulder main groove 3.

If the groove width W6 of the shoulder sub groove 20 is less than 0.35 times the groove width W1 of the shoulder main groove 3, there is a possibility that the wet performance is deteriorated.

If the groove width W6 of the shoulder sub groove 20 is more than 0.55 times the groove width W1, there is a possibility that the rigidity of the shoulder land portion 6 is reduced, and the steering stability on dry road surface is deteriorated.

From the same viewpoint, as shown in FIG. 2, the groove depth d5 of the shoulder sub groove 20 is preferably 0.37 or more times, more preferably 0.42 or more times, and preferably 0.57 or less times, more preferably 0.52 or less times the groove depth d1 of the shoulder main groove 3.

As shown in FIG. 6, by the shoulder sub groove 20, the shoulder land portion 6 is divided into a main portion 21 and a secondary portion 22.

The secondary portion 22 is disposed between the shoulder main groove 3 and the shoulder sub groove 20.

The secondary portion 22 is a rib which is not provided with any groove having a groove width larger than 1.5 mm.

The secondary portion 22 extends straight with a substantially constant width.

The ratio W7/W8 between the width W7 in the tire axial direction of the secondary portion 22 and the width W8 in the tire axial direction of the shoulder land portion 6 is preferably 0.10 or more, more preferably 0.15 or more, still more preferably 0.18 or more, and preferably 0.30 or less, more preferably 0.27 or less, still more preferably 0.20 or less. Thereby, the shoulder sub groove 20 is also disposed in a relatively axially inside part of the shoulder land portion 6. Therefore, a large ground pressure is applied to the shoulder sub groove 20 too, to exhibit excellent edge effect, and the on-snow performance is improved.

If the ratio W7/W8 is small, there is a possibility that the rigidity of an inside part in the tire axial direction of the shoulder land portion 6 is reduced, and the steering stability on dry road surface is deteriorated.

If the ratio W7/W8 is large, there is a possibility that the edge effect of the shoulder sub groove 20 is reduced.

The main portion 21 is disposed on the outside in the tire axial direction of the shoulder sub groove 20.

The main portion 21 is provided with shoulder lug grooves 30 and shoulder sipes 26.

The shoulder lug groove 30 extends from at least the tread edge Te toward the inside in the tire axial direction. The shoulder lug groove 30 has an inner end 30i terminating without being communicated with the shoulder sub groove 20.

In the shoulder lug groove 30 in the present embodiment, the groove width is gradually decreased toward the inside in the tire axial direction, and the inner end 30i is rounded to terminate.

Thereby, damages such as cracks in the shoulder land portion 6, starting from the inner end 30i of the shoulder lug groove 30, is suppressed.

The shoulder lug groove 30 improves the snow-ejecting performance during running on snowy roads, while maintaining the rigidity of the inside part in the tire axial direction of the shoulder land portion 6.

Therefore, the on-snow performance is improved, while maintaining the steering stability on dry road surface.

The shoulder lug groove 30 includes a first portion 31 and a second portion 32.

The first portion 31 of the shoulder lug groove 30 extends parallel with the tire axial direction.

The second portion 32 of the shoulder lug groove 30 continues from an inside in the tire axial direction of the first portion 31, and extends toward the inside in the tire axial direction, while gradually increasing the angle θ2 of the shoulder lug groove 30 with respect to the tire axial direction.

Such shoulder lug groove 30 maintains wandering performance by the first portion 31 and increases the edge component in the tire circumferential direction by the second portion 32 to effectively suppress skidding on snow.

The groove width W9 of the shoulder lug groove 30 is preferably 0.45 or more times, more preferably 0.48 or more times, and preferably 0.55 or less times, more preferably 0.52 or less times the groove width W1 of the shoulder main groove 3. If the groove width W9 of the shoulder lug groove 30 is less than 0.45 times the groove width W1 of the shoulder main groove 3, there is a possibility that the wandering performance is deteriorated.

If the groove width W9 of the shoulder lug groove 30 is more than 0.55 times the groove width W1 of the shoulder main groove 3, there is a possibility that the steering stability on dry road surface is deteriorated.

From the same viewpoint, as shown in FIG. 2, the groove depth d6 of the shoulder lug groove 30 is preferably 0.80 or more times, more preferably 0.83 or more times, and preferably 0.90 or less times, more preferably 0.87 or less times the groove depth d1 of the shoulder main groove 3.

As shown in FIG. 6, the ratio L1/W8 between the length L1 in the tire axial direction of the shoulder lug groove 30 from the tread edge Te and the width W8 in the tire axial direction of the shoulder land portion 6 is preferably 0.40 or more, more preferably 0.44 or more, still more preferably 0.46 or more, and preferably 0.56 or less, more preferably 0.52 or less.

If the ratio L1/W8 is smaller than 0.40, there is a possibility that the wandering performance is deteriorated.

If the ratio L1/W8 is more than 0.56, there is a possibility that the rigidity of the shoulder land portion 6 is reduced, and the steering stability on dry road surface is deteriorated.

The shoulder sipes 26 include a first shoulder sipe 27 and a second shoulder sipe 28.

The first shoulder sipe 27 is disposed between the shoulder lug grooves 30, 30 which are adjacent to each other in the tire circumferential direction.

The first shoulder sipe 27 extends substantially parallel with the shoulder lug grooves 30.

The inner end 27e in the tire axial direction of the first shoulder sipe 27 terminates within the main portion 21.

Such first shoulder sipe 27 increases the edge component, while maintaining the rigidity of the shoulder land portion 6. Thus, the on-snow performance is improved, while maintaining the steering stability on dry road surface.

The second shoulder sipe 28 extends from the inner end 30i of the shoulder lug groove 30 to the shoulder main groove 3. The second shoulder sipe 28 is inclined with respect to the tire axial direction to the same direction as the second portion 32 of the shoulder lug groove 30.

The second shoulder sipe 28 is inclined with respect to the tire axial direction to the opposite direction to the middle lateral groove 10 (shown in FIG. 1).

The second shoulder sipe 28 exerts an edge effect in a different direction than the middle lateral groove 10. Thereby, the on-snow performance is improved.

The second shoulder sipe 28 has a greater depth than the shoulder minor groove 20.

Such second shoulder sipe 28 more effectively exhibits the edge effect, and mitigates the rigidity of an inside part in the tire axial direction of the shoulder land portion 6.

Accordingly, the rigidity distribution in the tire axial direction of the shoulder land portion 6 becomes smooth.

Thus, the on-snow performance is improved, and the uneven wear of the shoulder land portion 6 is suppressed.

It is desirable that the first shoulder sipes 27 and the shoulder lug grooves 30 are disposed alternately in the tire circumferential direction.

Thereby, the rigidity distribution of the shoulder land portion 6 becomes uniform, and uneven wear of the shoulder land portion 6 is suppressed.

While detailed description has been made of the pneumatic tire of the present invention, the present invention can be embodied in various forms without being limited to the specific embodiments described above.

WORKING EXAMPLE

Pneumatic tires of size 185/60R15 having the basic pattern shown in FIG. 1 were experimentally manufactured based on the specifications shown in Table 1.

As a comparative example, a pneumatic tire not having a groove bottom sipe was experimentally manufactured.

Each test tire was tested for the steering stability on dry road surface and on-snow performance.

Common specifications to all of the tires and test methods are as follows.
    mounting rim: 15×63
    tire inner pressure: 230 kPa
    test vehicle:
    front-wheel-drive vehicle,
    engine displacement 1300 cc
    tire mounting position: all wheels <Steering Stability on Dry Road Surface>

The steering stability when the test vehicle was traveling on a test course constituted by a dry asphalt road was evaluated by driver's sense.

The result is a grade based on comparative example 1 being 100, wherein the larger the number, the better the steering stability.

<On-Snow Performance>

The on-snow performance when the test vehicle was traveling on snow was evaluated by driver's sense.

The result is a grade based on comparative example 1 being 100, wherein the larger the number, the better the steering stability.

The test results are shown in Table 1.

TABLE 1

| | comparative example 1 | working example 1 | working example 2 | working example 3 | working example 4 | working example 5 | working example 6 | working example 7 | working example 8 |
|---|---|---|---|---|---|---|---|---|---|
| middle lateral groove angle θ1 with respect to tire circumferential direction (deg.) | 40 to 60 | 40 to 60 | 30 to 50 | 50 to 70 | 40 to 60 | 40 to 60 | 40 to 60 | 40 to 60 | 40 to 60 |

TABLE 1-continued

|  | | | | | | | | | |
|---|---|---|---|---|---|---|---|---|---|
| middle lateral groove depth d3 (mm) | 4.0 | 1.0 | 1.0 | 1.0 | 0.3 | 0.8 | 1.2 | 1.5 | 1.0 |
| middle lateral groove width W4 (mm) | 1.6 | 1.6 | 1.6 | 1.6 | 1.6 | 1.6 | 1.6 | 1.6 | 1.0 |
| presence or absence of groove bottom sipe | absence | presence | presence | presence | presence | presence | presence | presence | presence |
| groove bottom sipe depth d4 (mm) | — | 3.0 | 3.0 | 3.0 | 3.0 | 3.0 | 3.0 | 3.0 | 3.0 |
| groove bottom sipe width W5 (mm) | — | 0.6 | 0.6 | 0.6 | 0.6 | 0.6 | 0.6 | 0.6 | 0.6 |
| middle lateral groove depth d3/groove bottom sipe depth d4 | — | 0.33 | 0.33 | 0.33 | 0.10 | 0.27 | 0.40 | 0.50 | 0.33 |
| ground contacting area Sr/virtual ground contacting area Sv of middle land portion | 0.85 | 0.85 | 0.85 | 0.85 | 0.85 | 0.85 | 0.85 | 0.85 | 0.85 |
| steering stability on dry road surface (grade) | 100 | 110 | 113 | 108 | 112 | 108 | 106 | 100 | 113 |
| on-snow performance (grade) | 100 | 110 | 108 | 112 | 107 | 108 | 110 | 116 | 108 |

|  | working example 9 | working example 10 | working example 11 | working example 12 | working example 13 | working example 14 | working example 15 | working example 16 | working example 17 | working example 18 |
|---|---|---|---|---|---|---|---|---|---|---|
| middle lateral groove angle θ1 with respect to tire circumferential direction (deg.) | 40 to 60 | 40 to 60 | 40 to 60 | 40 to 60 | 40 to 60 | 40 to 60 | 40 to 60 | 40 to 60 | 40 to 60 | 40 to 60 |
| middle lateral groove depth d3 (mm) | 1.0 | 1.0 | 1.0 | 1.0 | 1.0 | 1.0 | 1.0 | 1.0 | 1.0 | 1.0 |
| middle lateral groove width W4 (mm) | 1.3 | 3.0 | 1.6 | 1.6 | 1.6 | 1.6 | 1.6 | 1.6 | 1.6 | 1.6 |
| presence or absence of groove bottom sipe | presence | presence | presence | presence | presence | presence | presence | presence | presence | presence |
| groove bottom sipe depth d4 (mm) | 3.0 | 3.0 | 3.0 | 3.0 | 3.0 | 3.0 | 4.0 | 3.0 | 2.7 | 2.0 |
| groove bottom sipe width W5 (mm) | 0.6 | 0.6 | 0.2 | 0.4 | 1.0 | 1.2 | 0.6 | 0.6 | 0.6 | 0.6 |
| middle lateral groove depth d3/groove bottom sipe depth d4 | 0.33 | 0.33 | 0.33 | 0.33 | 0.33 | 0.33 | 0.25 | 0.33 | 0.37 | 0.50 |
| ground contacting area Sr/virtual ground contacting area Sv of middle land portion | 0.85 | 0.85 | 0.85 | 0.85 | 0.85 | 0.85 | 0.80 | 0.83 | 0.87 | 0.90 |
| steering stability on dry road surface (grade) | 110 | 107 | 112 | 110 | 107 | 108 | 109 | 112 | 113 | 111 |
| on-snow performance (grade) | 109 | 112 | 107 | 109 | 113 | 113 | 111 | 111 | 110 | 108 |

From the test results, it was confirmed that the pneumatic tires as the working examples were improved in the on-snow performance, while maintaining the steering stability on dry road surface, Next, with respect to pneumatic tires of 185/60R15 having the basic pattern shown in FIG. 1, similar tests were performed by changing the ratio W8/W3 or the ratio W7/W8. The test results are shown in Table 2.

TABLE 2

| Tire No. | 1 | 2 | 3 | 4 | 5 | 6 | 7 | 8 | 9 | 10 | 11 | 12 |
|---|---|---|---|---|---|---|---|---|---|---|---|---|
| Ratio W8/W3 | 1.30 | 2.20 | 1.80 | 1.80 | 1.80 | 1.80 | 1.75 | 1.85 | 1.60 | 2.00 | 1.80 | 1.80 |
| Ratio W7/W8 | 0.20 | 0.20 | 0.13 | 0.33 | 0.20 | 0.20 | 0.20 | 0.20 | 0.20 | 0.20 | 0.15 | 0.30 |
| Steering stability on dry road surface (grade) | 100 | 105 | 105 | 107 | 112 | 114 | 113 | 114 | 111 | 112 | 113 | 111 |
| On-snow performance (grade) | 100 | 100 | 100 | 98 | 108 | 106 | 107 | 106 | 108 | 107 | 107 | 109 |

Next, with respect to pneumatic tires of 185/60R15 having the basic pattern shown in FIG. 1, similar tests were performed by changing the ratio W6/TW or the ratio d5/d1 while limiting the ratio W8/W3 within a range of 1.6 to 2.0. The test results are shown in Table 3.

TABLE 3

| Tire No. | 13 | 14 | 15 | 16 | 17 | 18 | 19 | 20 | 21 | 22 | 23 |
|---|---|---|---|---|---|---|---|---|---|---|---|
| W6/TW(%) | 2.0 | 2.0 | 2.0 | 2.0 | 2.0 | 1.3 | 2.7 | 2.0 | 2.0 | 2.0 | 2.0 |
| Ratio d5/d1 | 0.40 | 0.40 | 0.40 | 0.40 | 0.40 | 0.40 | 0.40 | 0.10 | 0.25 | 0.50 | 0.60 |
| Steering stability on dry road surface (grade) | 100 | 100 | 100 | 98 | 96 | 101 | 97 | 101 | 98 | 98 | 95 |
| On-snow performance (grade) | 100 | 94 | 96 | 98 | 98 | 98 | 101 | 95 | 100 | 101 | 101 |

DESCRIPTION OF THE SIGNS 1 pneumatic tire
2 tread portion
3 shoulder main groove
4 center main groove
5 middle land portion
6 shoulder land portion
10 middle lateral groove
15 groove bottom sipe

The invention claimed is:

1. A pneumatic tire comprising a tread portion provided with
a pair of shoulder main grooves extending continuously in the tire circumferential direction on the outermost tread edge side,
a center main groove extending continuously in the tire circumferential direction between the shoulder main grooves,
a shoulder land portion on the outer side in the tire axial direction of each of the shoulder main grooves, and
a middle land portion between each of the shoulder main grooves and the center main groove,
wherein the middle land portion is provided with middle lateral grooves each extending from the shoulder main groove toward the inside in the tire axial direction, while decreasing the angle with respect to the tire circumferential direction,
wherein the middle lateral grooves include first middle lateral grooves extending to the center main groove and second middle lateral grooves terminating in the middle land portion, and the middle lateral grooves are each provided with a groove bottom sipe extending along the middle lateral groove and opened in the groove bottom of the middle lateral groove, and
wherein the groove bottom sipe has a width of from 0.4 to 1.0 mm and the middle lateral groove has a width of from 1.3 to 3.0 mm and a depth of from 0.6 to 1.5 mm.

2. The pneumatic tire according to claim 1, wherein, in said middle land portion, the first middle lateral grooves and the second middle lateral grooves are provided alternately in the tire circumferential direction.

3. The pneumatic tire according to claim 2, wherein the angle of the middle lateral grooves with respect to the tire circumferential direction is 40 to 60 degrees.

4. The pneumatic tire according to claim 1, wherein the angle of the middle lateral grooves with respect to the tire circumferential direction is 40 to 60 degrees.

5. The pneumatic tire according to claim 1, wherein, in said middle land portion, a ratio Sr/Sv between an actual ground contacting area Sr of the middle land portion and a virtual ground contacting area Sv of the middle land portion measured in such a state that all grooves provided in the middle land portion are filled is 0.80 to 0.90.

6. The pneumatic tire according to claim 1, wherein a ratio W8/W3 between a width W8 in the tire axial direction of said shoulder land portion and a width W3 in the tire axial direction of said middle land portion is 1.6 to 2.0.

7. The pneumatic tire according to claim 1, wherein said groove bottom sipe has a depth in a range from 2.5 mm to 3.5 mm.

8. The pneumatic tire according to claim 1, wherein a ratio of said depth of the middle lateral groove to the depth of said groove bottom sipe is in a range from 0.30 to 0.40.

9. A pneumatic tire comprising
a tread portion provided with a pair of shoulder main grooves extending continuously in the tire circumferential direction on the outermost tread edge side, a center main groove extending continuously in the tire circumferential direction between the shoulder main grooves, a shoulder land portion on the outer side in the tire axial direction of each of the shoulder main grooves, and a middle land portion between each of the shoulder main grooves and the center main groove,
wherein said middle land portion is provided with middle lateral grooves extending from the shoulder main groove toward the inside in the tire axial direction, while decreasing the angle with respect to the tire circumferential direction, and the middle lateral grooves are each provided with a groove bottom sipe extending along the middle lateral groove and opened in the groove bottom of the middle lateral groove,
wherein said shoulder land portion is provided with a shoulder sub groove extending continuously in the tire circumferential direction and having a smaller groove width than that of the shoulder main groove, so as to define a main portion on the outside in the tire axial direction of the shoulder sub groove and a secondary portion between the shoulder sub groove and the shoulder main groove, the secondary portion having a width in the tire axial direction which is 0.15 to 0.30 times the width in the tire axial direction of the shoulder land portion, and
wherein the main portion is provided with a plurality of shoulder lug grooves extending from a tread edge toward the inside in the tire axial direction and terminating without being communicated with the shoulder sub groove.

10. The pneumatic tire according to claim 9, wherein the main portion is provided with a first shoulder sipe of which inner end in the tire axial direction terminates within the main portion.

11. The pneumatic tire according to claim 9, wherein said shoulder land portion is provided with a second shoulder sipe extending from the inner end in the tire axial direction of each of the shoulder lug grooves to the shoulder main groove.

12. The pneumatic tire according to claim 11, wherein the second shoulder sipes are inclined with respect to the tire axial direction to the opposite direction to the middle lateral grooves.

13. The pneumatic tire according to claim 9, wherein a groove width W6 of the shoulder sub groove is 1.3% to 2.7% of a tread width TW which is the distance in the tire axial direction between the tread edges.

14. The pneumatic tire according to claim 9, wherein the groove depth d5 of the shoulder sub groove is 0.25 to 0.50 times the groove depth d1 of the shoulder main groove.

* * * * *